(12) United States Patent
Driessen (10) Patent No.: US 7,883,104 B2
(45) Date of Patent: Feb. 8, 2011

(54) MOBILE CARRIAGE, FOR EXAMPLE FOR A BUGGY

(75) Inventor: Franciscus Johannes Driessen, Goirle (NL)

(73) Assignee: Musty B.V., Goirle (NL)

( * ) Notice: Subject to any disclaimer, the term of this patent is extended or adjusted under 35 U.S.C. 154(b) by 451 days.

(21) Appl. No.: 11/662,192

(22) PCT Filed: Sep. 15, 2005

(86) PCT No.: PCT/NL2005/000674

§ 371 (c)(1),
(2), (4) Date: Sep. 18, 2007

(87) PCT Pub. No.: WO2006/031111

PCT Pub. Date: Mar. 23, 2006

(65) Prior Publication Data

US 2008/0191451 A1  Aug. 14, 2008

(30) Foreign Application Priority Data

Sep. 16, 2004 (NL) .................................... 1027057

(51) Int. Cl.
*B62B 7/06* (2006.01)
(52) U.S. Cl. ..................... 280/650; 280/642; 280/647; 280/658
(58) Field of Classification Search ............... 280/638, 280/35, 639, 38, 40, 641, 42, 642, 647, 650, 280/657, 658
See application file for complete search history.

(56) References Cited

U.S. PATENT DOCUMENTS 3,836,164 A * 9/1974 Sugino et al. ............... 280/642

(Continued)

FOREIGN PATENT DOCUMENTS

| FR | 2164026 | 7/1973 |
|---|---|---|
| GB | 652176 | 4/1951 |

OTHER PUBLICATIONS

International Search Report (PCT/ISA/210).

*Primary Examiner*—J. Allen Shriver, II
*Assistant Examiner*—Bryan A Evans
(74) *Attorney, Agent, or Firm*—Harness, Dickey & Pierce, P.L.C.

(57) ABSTRACT

An embodiment of the present invention discloses a carriage, for instance for a buggy, including a frame to which a number of first arms are pivotally connected, wherein the first arms can be placed in a position of use and in a compact position, wherein the carriage has at least one locking device. An embodiment of the invention is directed to a carriage including at least one second arm which is pivotally connected to at least one first arm, wherein the second arm can be locked in the position of use by at least one locking device. An embodiment of the present invention also discloses a mobile carriage having a frame provided with at least one central part and with at least one third arm which is connected fixedly to the central part, wherein the buggy has a position of use and a compact position. An embodiment of the present invention is directed to a carriage including a third arm provided with at least one guide device which can be guided along the third arm and at least two first arms are connected in each case to a coupling rod coupled to the guide.

18 Claims, 8 Drawing Sheets

U.S. PATENT DOCUMENTS 3,848,884 A * 11/1974 Lines et al. .................. 280/644
3,936,069 A *  2/1976 Giordani ..................... 280/650
4,152,010 A *  5/1979 Kassai ........................ 280/650
6,095,548 A *  8/2000 Baechler ..................... 280/650
6,478,104 B1 * 11/2002 Kemper ...................... 180/214
7,445,228 B2 * 11/2008 Henry ........................ 280/639

* cited by examiner

MOBILE CARRIAGE, FOR EXAMPLE FOR A BUGGY

The invention relates to a mobile carriage, for instance for a buggy, comprising a frame which comprises at least one central part to which are pivotally connected a number of first arms, including a pusher and an arm provided with a bearing-mounted wheel, and wherein the first arms can be placed in a position of use and in a compact position, wherein the carriage has locking means for locking the arms in the position of use.

Such a mobile carriage for a pushchair or a buggy is known. The buggy is foldable. In the position of use the carriage can be used for displacement over a ground surface, wherein the wheels roll over the ground, and in the compact position the different arms are moved closer toward each other, whereby the volume of the carriage in fact decreases. The carriage can be used as a buggy by arranging a seat thereon, but can also be used as a carriage for a releasable seat which can be coupled to the carriage. In yet another embodiment a baby travel seat, such as a car seat known under the brand name MaxiCosy®, can be coupled. The position of use can be maintained with the locking means, for instance in that pivoting of the arms is blocked.

In the position of use the carriage is suitable for transporting fragile loads, in particular babies. In the compact position the carriage can be transported in compact manner. The different arms are in fact folded toward each other.

A problem with the known mobile carriages is that the arms protruding from the central part bend, and in extreme cases can break off, due to forces caused by a great leverage at a distance from the central part.

The object of the invention is to provide a carriage having arms protruding from a central part, wherein the frame is strengthened. This object is achieved by arranging at least one second arm which is pivotally connected to the first arm and wherein this second arm can be locked in the position of use by locking means. The frame with the protruding arms is hereby strengthened in the position of use. The second arm is pivotally connected to the first arm, whereby the second arm can be rotated into the compact position, in particular rotated such that no increase in volume of the compact position is in fact brought about.

In addition, the second arm forms an additional connection between the first arm and a component of the frame, and the second arm engages on this first arm at a distance from the central part. The lever function of forces acting on the outer ends of the arm is hereby reduced considerably. A triangular construction is in fact obtained, wherein the triangle runs via a part of the side of the central part, a part of the first arm and along the second arm.

According to a further embodiment, the second arm has locking means which co-act with locking means on the central part for the purpose of locking the arms in the position of use. An engaging means can for instance be fixed to the second arm by clamping or by other manner of engagement, and engages on the central part, for instance on a projection of the central part. The second arm is hereby fixed to the central part. Existing systems can hereby be readily added to by arranging the pivotal second arm on a first arm, which then engages on the central part with its own locking means.

In a preferred embodiment locking means are present on the carriage which are adapted to lock the carriage in the position of use, both by engaging one of the first arms and by engaging one of the second arms. A dual safety is hereby obtained, which is particularly useful, and sometimes even a legal requirement, in the transport of fragile loads. The position of use of the first arm connected to the second arm is locked by locking the second arm. This same arm can be locked by other components of the locking means at a different position, for instance in the central part or close to the pivotable fastening to the central part. The position of use is hereby secured by two locks. Owing to the double locking, wherein one locking takes place via the second arm, two independent locks are obtained which result in doubling of the security. The locking means preferably engage on at least one pusher for the purpose of locking the pusher in the position of use.

In a particular embodiment the second pivotal arm is connected to the pusher by means of a hinge. In known carriages and buggies the pusher protrudes obliquely upward from the central part. The second arm is connected to the pusher with a hinge and can engage on the central part, which central part is for instance situated under the seat. The triangular function in particular is obtained here, wherein the operating distance and lever function of forces acting on the pusher are reduced.

It is further favourable that the carriage comprises two first arms embodied as pushers, which are each provided with a hinge, and that the second arm is connected to both pushers via the hinges. One second arm is hereby obtained, for instance a U-shaped tube which is connected to the two pushers with or close to the outer ends of the legs of the U. The base of the U can be connected to the central part. Because the second arm is arranged between the pushers, the distance between the pushers is fixed. The second arm strengthens the coupling between the two pushers. A closed force diagram is moreover obtained which runs via the central part, via one of the pushers, via the second arm, to the other pusher and back to the central part. This all strengthens the frame.

According to a further embodiment, the carriage is provided with two first arms which are embodied as pushers, and these pushers have a common pivot axis. The pivot axes of the pushers lie mutually in line. The pushers hereby carry out the same pivoting movement relative to the central part. Coupling to the second arm can hereby be facilitated.

According to a further embodiment, the two pushers are mutually connected via the common pivot shaft. As a result the two pushers cannot pivot relative to the central part independently of each other. In a particular embodiment the two arms are mutually connected at the ends remote from the central part. The two arms form part of one U-shaped profile. The arms are connected by the central part via the common pivot shaft, whereby a closed force diagram is obtained. This improves the strength of the frame.

In a preferred embodiment the pushers are mutually connected by means of a lock. Independent rotation, a frequently occurring problem with non-continuous separate pushers, is hereby prevented. The pushers can be provided with telescopic elements, whereby the length of the arm is adjustable.

The second arm preferably has a support means. A load can hereby be supported. The load can be supported for instance in that the second arm is provided with a seat on which a baby can for instance be placed. The seat can be formed as a chair. In another embodiment the support means is embodied for coupling to a separate baby seat such as a car seat.

According to a further embodiment, each first arm is coupled to at least one other first arm by means of a coupling device. The change from the position of use to the compact position, and vice versa, is hereby performed simultaneously by all the first coupled arms. When one first arm is pivoted relative to the central part, the other arms will also be moved via the coupling device. When one arm is locked by the locking means, movement of the other arms is not possible either.

In a preferred embodiment the central part is fixedly connected to at least one third arm which is embodied as a guide, and the coupling device preferably comprises a number of coupling rods which are connected to the first arms and which are connected to a guide means which can be guided on the guide. Coupling between the first arms hereby takes place via a guide means. This guide means is displaced over the guide and thus moves in a fixed path. The movement of the coupling rods is hereby guided, and the same movement is carried out each time the situation is changed. Because the guide is arranged between the different coupling rods connected to the first arms, the respective movements of the first arms can be varied extensively by means of the engaging points of the coupling rods on the first arms, and a better compact position wherein the arms are folded together is possible. The coupling rods are pivotally connected to the first arm.

According to yet another embodiment, the carriage comprises a handle which is connected to a pivot shaft of at least one of the arms. A user can hereby engage the handle and for instance pull it toward him/her. Owing to the direct coupling of the handle to one of the pivot shafts of one of the arms, in particular one of the first arms, the pulling force of the user is converted into a rotation of this arm, and this rotation is transmitted to the other arm(s) via the coupling rod, whereby a change from the one position to the other position is achieved. The handle makes the transition to a different position considerably easier. The handle can moreover be used as a point of engagement for the user in the compact position. The handle can be used as a handgrip for carrying the carriage according to the invention by hand in the compact position. The handle is then situated on the opposite side of the central part remote from the arms which have been pivoted into the compact position. The arms are pivoted toward each other in the manner of an umbrella.

In a preferred embodiment the handle is received in a receiving space of the central part. The handle is hereby concealed in the central part.

According to a further embodiment, the second arm locked in the position of use blocks the receiving space at least partially. As a result the handle cannot be freely engaged by the user in the position of use. Only when the second arm is unlocked does the receiving space become freely accessible and can the handle be engaged and pulled so that the pivot shaft of the first arm is operated. The second arm is unlocked before the handle can be used.

In a further preferred embodiment, the second arm is provided with a seat, wherein the seat blocks access to the receiving space in the position of use. A carriage is hereby obtained for a buggy, wherein in the position of use the seat is arranged on the central part, locked thereto by means of the locking means, and wherein due to this locking the handle received in a receiving chamber of the central part is not accessible. Before the handle is made accessible, the seat must be pivoted aside by unlocking the second arm(s) and pivoting these second arms. Only then is the user able to employ the handle.

According to a further preferred embodiment, the handle is connected to a pivot shaft of the first arm via a hinge and the handle is provided with a projection which, in the position of use, is received in a recess in the central part for the purpose of locking the position of use. A second locking of the first arms in the position of use is hereby achieved. The projection and the recess in the central part co-acting therewith form the locking means. Due to the hinge arranged between handle and pivot shaft the projection can be moved out of the recess and the position of use is unlocked. Thereafter the user can pull the handle freely, whereby the rotation of the pivot shaft is brought about and rotation of the first arms achieved.

The carriage further has at least two first arms which are provided with bearing-mounted wheels, and these arms have two different pivot axes. The pivot axes do not lie mutually in line. In a preferred embodiment the axes form a mutual angle of between 1° and 80°. In a further preferred embodiment the pivot axes of the arms provided with a bearing form an angle of between 1° and 40°, preferably 10 and 40', with the pivot axis of the pushers. Because the pivot axes of the arms with wheels are arranged at different angles, it is possible to achieve a more compact position. The arms with wheels can hereby be pivoted and carried into place in the compact position wherein they are positioned around a third fixed arm on which a wheel is mounted. In the compact position the first arms enclose the third arm. The wheel base can hereby further be enlarged in the position of use. The distance between the wheels on the first arms is greater in the position of use than the distance between these wheels in the compact position. This is achieved in that the pivot axes are not the same but, conversely, run in different directions.

The invention further relates to a carriage, for instance for a buggy, comprising a carriage provided with at least one central part, with a number of first arms arranged pivotally on the central part, and with at least one third arm which is connected fixedly to the central part, wherein the buggy has a position of use and a compact position. The invention is characterized in that the third arm is provided with a guide means which can be guided along this third arm and at least two first arms which are connected in each case with a coupling rod to the guidable guide means. According to the invention a carriage is obtained, for instance for a buggy, wherein the different arms which are pivotable relative to the central part are guided in their movement by coupling rods and are mutually coupled via the coupling rods and the guide. A considerable strengthening of the frame in the position of use is hereby obtained compared to the prior art. Further advantageous embodiments will be described with reference to the drawings.

In another embodiment the central part is provided with a locking mechanism. The locking mechanism preferably comprises a covering body which is formed from two parts and in which a spring mechanism is accommodated. The spring mechanism can engage on a bracket which is arranged in a receiving space and which is for instance connected to the second arm according to the invention. The second arm is hereby engaged by the spring mechanism and locked in a position of use.

The central part preferably consists of two bodies. The central part is preferably provided with a locking mechanism with which one of the pivoting buggy parts, in particular the seat, can be secured. The buggy is held in the position of use by securing the seat or another component, wherein the seat is preferably connected to the pushers.

In one embodiment the locking mechanism can be formed by a shaft provided with one or a number of handles. This shaft is received in the central part. The shaft is bearing-mounted. Operation of the handle results in a spring mechanism pushing the seating surface upward. The handle is provided with two protruding hook parts which engage on preferably one tube fixedly arranged on the underside of the seating surface. The hooking holds the tube, and therewith the seating surface, in place. When the hooks are swung aside by means of operating the handle, a spring mechanism can be set into operation which pushes the engaged tube of the seating surface out of engagement, whereby it is released and whereby the buggy/carriage can be carried from the position of use to the compact position.

The second arm, or in particular the seating surface, can further be provided with a support for the legs which is pivotally connected to this second arm or to the seating surface. In a further preferred embodiment, a foot support can also be arranged on the third arm, which is preferably the arm of the front wheel. This foot support is preferably mounted fixedly on the front legs. In a further embodiment the foot support is pivotally connected to the fastening means with which this foot support is fastened to the front legs.

It is further favourable to connect a backrest to the central part. The backrest is preferably connected pivotally to the central part. In a preferred embodiment the pivot axis of the backrest is the same as the pivot axes of the pushers. It is further advantageous to connect the backrest to the arms of the pushers by means of a sleeve which can be arranged around the pivot axis of these pushers. The backrest can hereby be rotated, independently of the pushers or arms of these pushers, around the same axis. The backrest is preferably connected at two positions to the shaft corresponding with this axis.

The coupling rod connecting the pushers to the guidable guide means is preferably arranged on the lock connecting the pushers to each other.

Applicant wishes to expressly state here that divisional applications relating to a carriage, for instance for a buggy, with a frame, a central part and arms connected pivotally thereto are possible in combination with any of the measures as stated in this patent application. A divisional application is particularly being considered in respect of a carriage comprising a frame with a central part, first arms connected pivotally thereto, wherein the carriage has a position of use and a compact position, characterized in that a third arm is fixedly coupled to the central part and that this third arm has a guide.

The invention is further described with reference to the annexed figures, in which.

Figure 1:
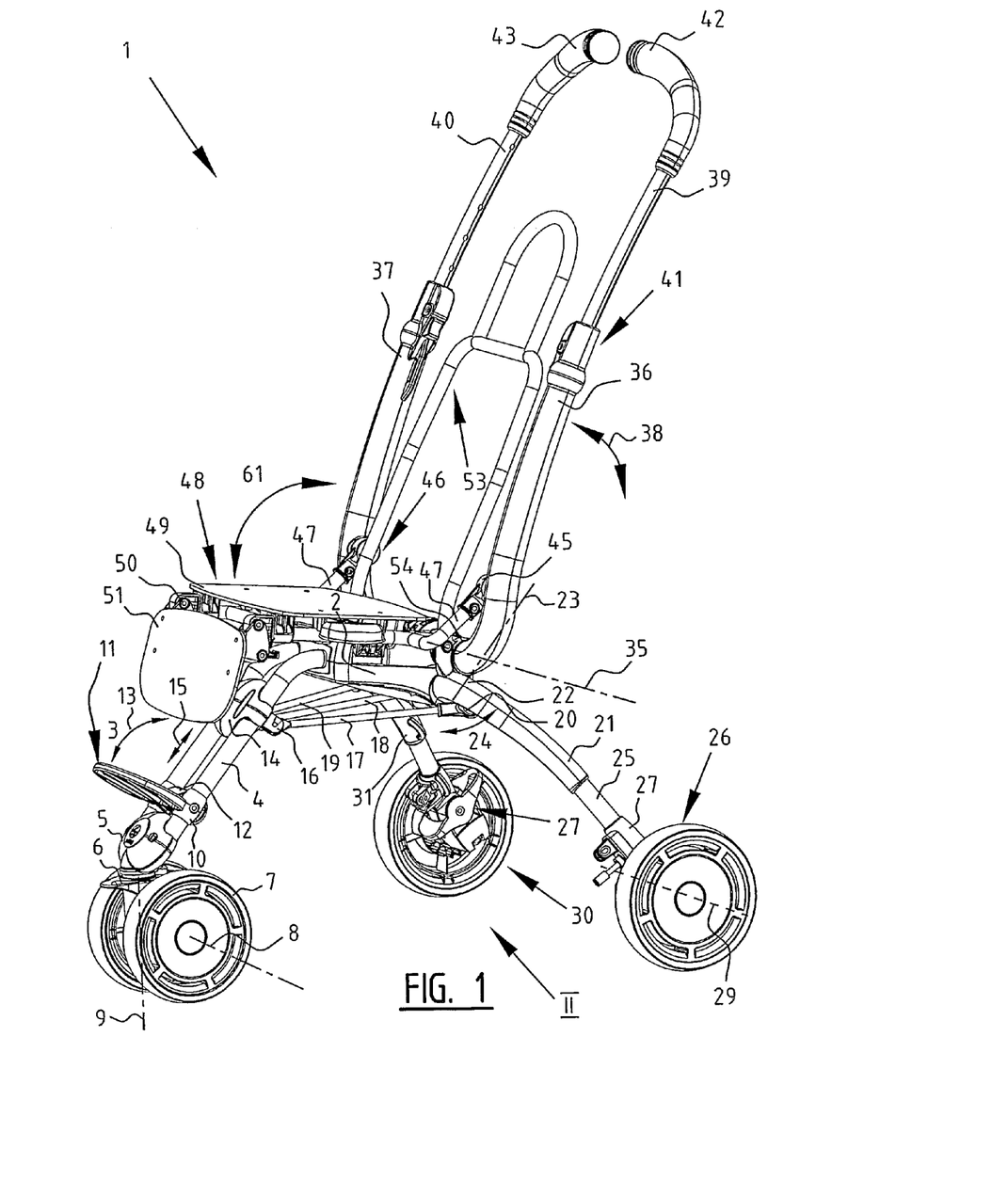
FIG. 1 shows a perspective view of a carriage according to the invention in a position of use.

FIG. 1 shows a carriage 1 or buggy 1 according to a first embodiment. The buggy is provided with a central part 2, which forms the central part of the frame and to which other frame parts, such as the arms, are connected. Two front arms 3 and 4 are fixedly connected to the central part. The arms run substantially parallel to each other. These arms form the third arms of the frame of a buggy 1. A front wheel 7 which is bearing-mounted about axis 8 is connected pivotally with a bearing 6 to front arms 3 and 4 via a mounting means 5 which engages on the outer ends of front arms 3 and 4. Front wheels 7 can rotate around axis 8 and can turn on the substantially vertical axis 9 of bearing 6. Front wheels 7 form the steering wheels of buggy 1.

A foot support 11 is arranged on front arms 3 and 4 by means of a fixing means 10, which engages on tubes 3 and 4 and in which the tubes are received, which foot support can pivot as according to arrow 13 by means of a hinge 12. The foot support is an additional support means for a user of a buggy 1, such as a child. By pivoting the foot support as according to arrow 13 the foot support can be placed substantially against or adjacently of front arms 3 and 4. This is particularly efficient in a compact position.

A slide block or guide 14 can be guided over the tubes of front arms 3 and 4. The guide can move reciprocally as according to arrow 15 over the substantially linear parts of front arms 3. The sliding movement runs according to a predetermined path which will be the same in every sliding movement. Sliding block 14 is pivotally connected via hinges 16 to, in this embodiment, three coupling rods 17,18 and 19. Via hinge 20 coupling rod 17 engages on rear arm 21 which is pivotally connected via a hinge 22 to central part 2. Rear arm 21 is one of the first arms according to the invention. Rear arm 21 can rotate about axis 23 as according to arrow 24.

Rear arm 21 has an extended part 25, which has an outer end provided with a rear wheel device 26 which engages on the tube end of part 25 via an engaging means 27. The wheel is provided with a clamping means 28 which blocks rotation of the wheel about axis 29. The clamping devices arranged on the two rear wheels 26,30 can co-act. A coupled locking and unlocking can be arranged between the wheels.

Rear arm 31 is also pivotally connected to central part 2. The pivot axes of rear arms 21 and 31 are not arranged mutually in line but form an angle to each other, in the shown embodiment an angle of between 10° and 30°.

Figure 7:
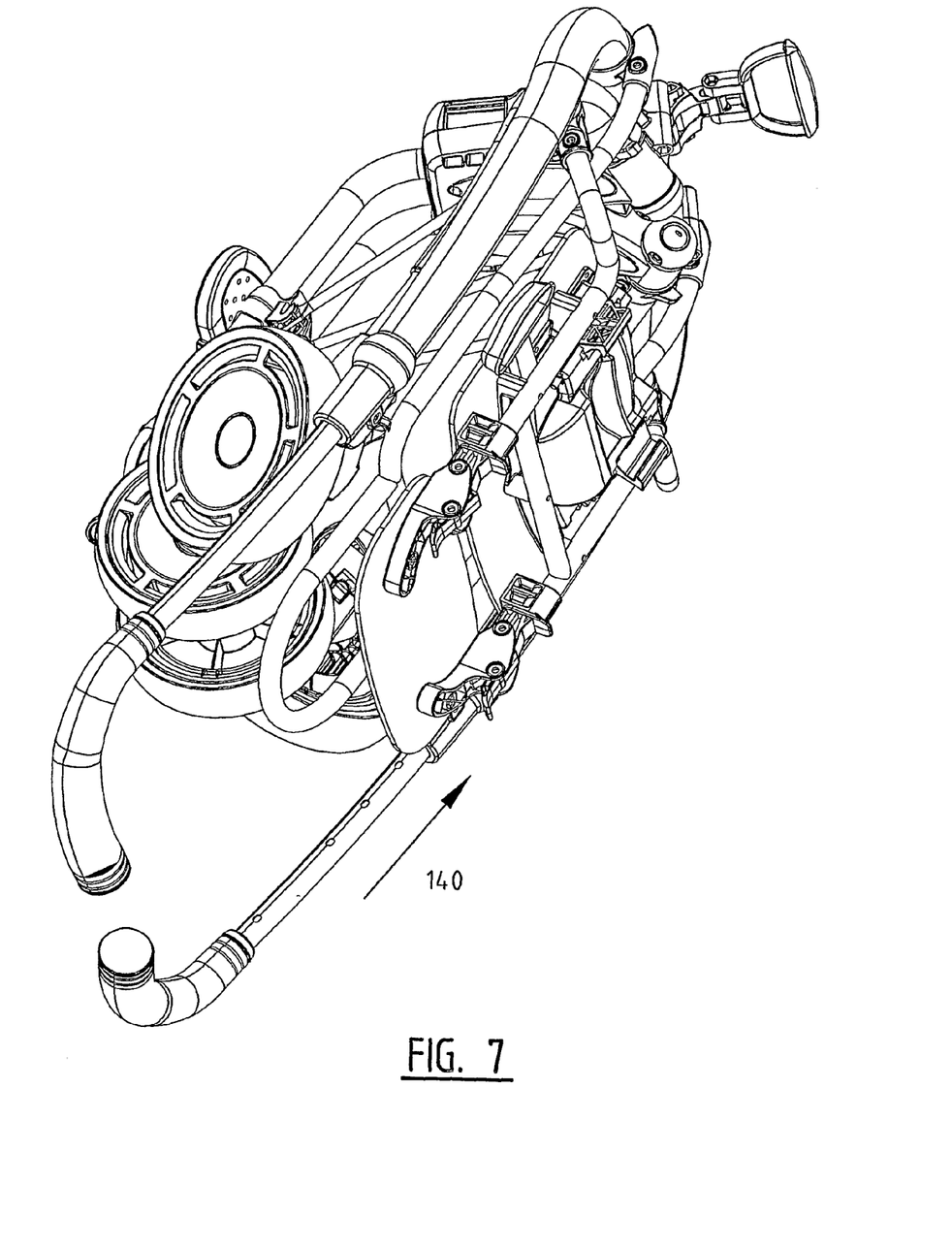
FIG. 7 shows the carriage according to the first embodiment in the compact position.

Because pivot axes 23 of first arms 21 and 31 are not arranged mutually in line and form an angle relative to the ground surface formed by the bottom contact surface of wheels 7,30 and 26, rear arms 21,31 will pivot out of the shown position of use as according to arrow 24, wherein wheels 26, 30 will be moved toward each other and in particular in the direction of front wheels 7. In the compact position as shown in FIG. 7, front wheel 7 will be enclosed by rear wheels 26 and 30. The pivot axis protrudes obliquely upward and obliquely forward from the central part. The compact position hereby becomes less voluminous.

Coupling rod 19 connects sliding means 14 to rear arm 31. When sliding means 14 moves as according to arrow 15, for instance toward front wheels 7, rear arm 21 and rear arm 31 will simultaneously pivot as according to arrow 24 about the respective pivot axis toward the compact position.

Sliding means 14 is further connected via connecting rod 18 via a pivot shaft 35 to pushers 36,37, which are pivotally connected to central part 2 as first arms. Pivot shaft 35, formed by a form-fitting tube, runs through a part of the central part, and in the preferred embodiment both pushers 37,38 are fixedly connected to each other via the pivot shaft. Pivoting of pusher 36 as according to arrow 38 will also take place with pusher 37 due to the form-fitting coupling. Owing to the coupling via coupling rod 18 to sliding means 14, pivoting of pusher 36 as according to arrow 38 will result in pivoting of the rear arms as according to arrow 24. When he/she changes the position of use, for instance from the position of use to the compact position, the user will, when pivoting one of the first arms, hereby simultaneously also cause the other first arms to pivot relative to the central part. Pushers 36,37 are embodied in known manner.

The respective arms 39,40 are accommodated telescopically in arms 36,37 and can be fastened by a clamping means 41. Arranged on the ends of arms 39,40 are handles 42,43, with which the user, for instance the parent of a child, can push the buggy. In another embodiment the outer ends of arms 39,40 are mutually connected. A U-shaped pusher is hereby obtained, consisting of arms 36,37, arms 39,40 and connected gripping parts 42,43.

Pushers 36,37 are further connected by means of a hinge 45,46 to a second arm 47 which is connected in the shown embodiment to both hinge 45 and 46. Second arm 47 forms part of the seat part which is designated generally with 48. The seat part is shown further in FIG. 3. Connected to arms 47 is a seat platform on which a child can sit. Other embodiments are of course possible.

The seat part is further hingedly connected to a front end by means of a hinge 50 with a further leg support surface 51. The leg support surface ensures the further support of the legs of for instance a child sitting on seat 49. Further details relating to the seat frame will be described with reference to FIG. 3.

A back support 53 can be pivoted around the same pivot shaft 35 since it is fastened on this shaft 35 on pushers 36,37 by means of clamping sleeves 54. In the shown embodiment the backrest is an A-shaped frame. Other embodiments are possible.

FIG. 1 shows buggy 1 in the position of use, wherein a child can sit on seating surface 41 and wherein the back is supported by means of back support 53. The buggy can be folded up into a more compact state, wherein the buggy can for instance be transported in a car.

Figure 2:
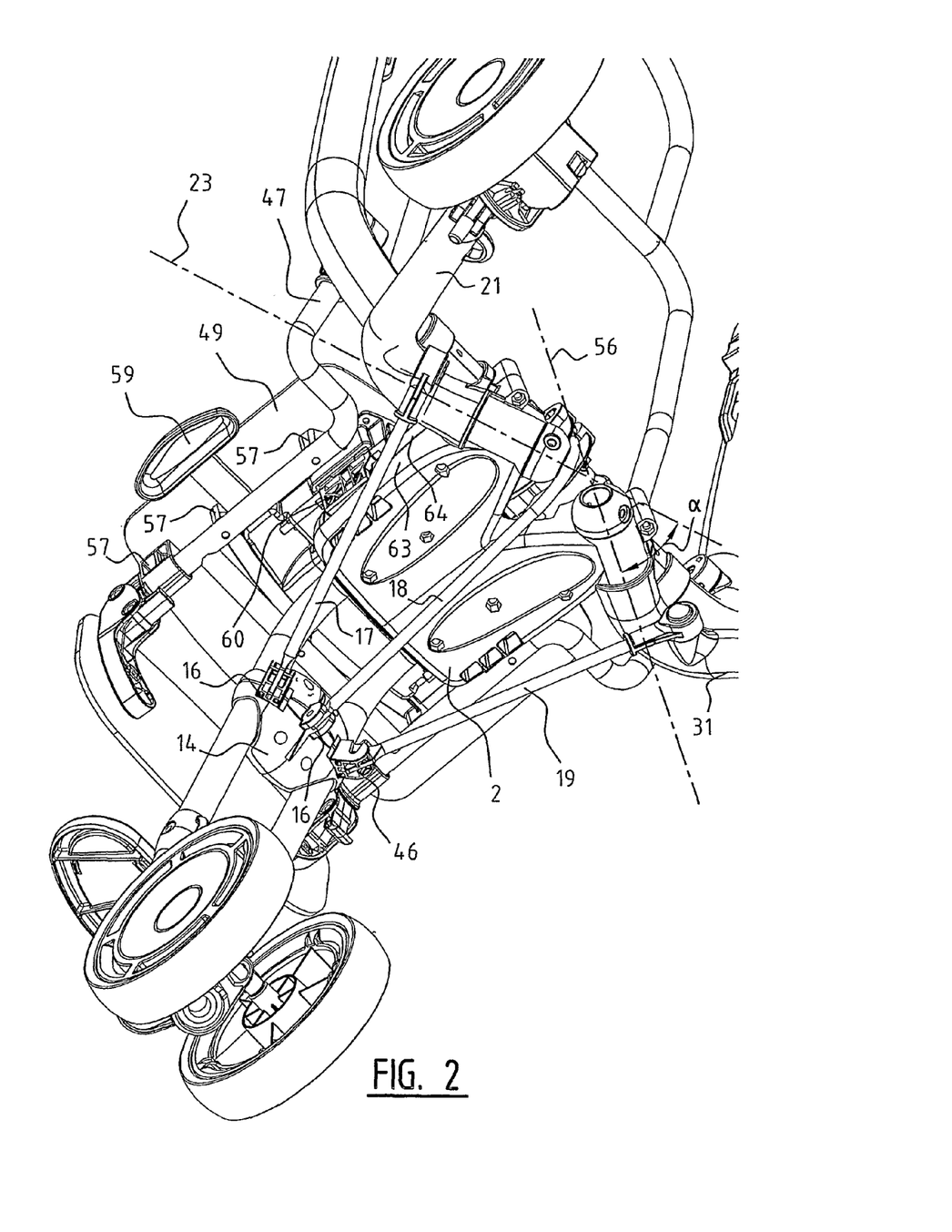
FIG. 2 shows a perspective view according to arrow II in FIG. 1.

FIG. 2 shows a bottom view of buggy 1 as according to arrow II in FIG. 1. Shown are the hinges 16 with which coupling rods 17,18,19 are connected to sliding part 14. The pivot axes 23,56 of the respective rear arms 21,31 can further be seen. They form a mutual angle α which is roughly equal to 20°.

Seating surface 49 is coupled to second arm 47 via fixing means 57. The second arm is further provided with an operating handle 59 which forms part of the locking means for locking buggy 1 in the position of use. Operation of handle 59 results in unlocking of seat part 48 from central part 2. Seat part 48 is provided with hooking clamps 60 which engage in a recess of the central part in a locked position. The seat part connected to second arm 47 can hereby not pivot as according to arrow 61, and pivoting of the pushers as according to arrow 38 is hereby also prevented. A triangular figure is in fact obtained, consisting of the central part, the arms 36,37 connected pivotally thereto and the second arm 47 which is connected to first arms 36,37 via hinges 45,46 and via the locking with engagement on central part 2. Because hinges 45,46 are situated at a distance from central part 2, the length of handle, here now the distance between point of engagement 45,46 and the outer end of the pushers, is reduced.

In this preferred embodiment the central part consists of two body parts 63,64 which are formed by injection moulding. This method of forming will be known to the skilled person. Parts connected to the central part can be accommodated by being clamped between both parts or can be received in receiving spaces of the respective parts.

Figure 3:
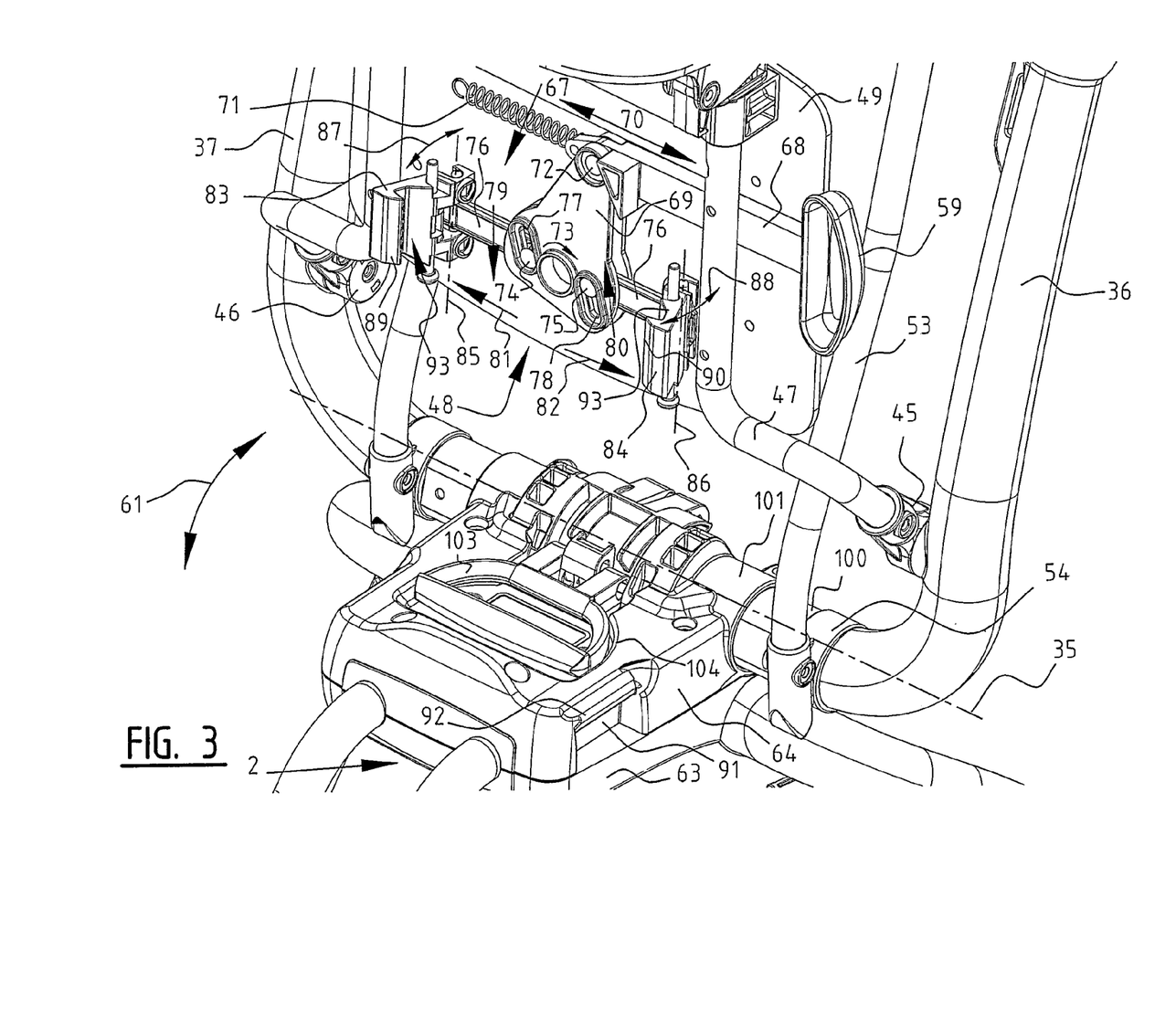
FIG. 3 is a perspective view of a detail of the carriage according to FIG. 1 wherein the seat is unlocked.

FIG. 3 shows a perspective view of the carriage of FIG. 1 in a situation where seating surface 48 has been released from central part 2. The locking has been broken. Second arm 47 is pivoted about hinges 45,46 as according to arrow 61. The first arms, including the pushers, and the rear wheel arms are still in the position of use. The central part and seat part 48 are provided with locking means. Only the locking means for locking the seating surface are unlocked.

On the underside of seat part 49 is arranged a locking means which is designated generally with 67. Handle 59 is connected to disc 69 via a rod 68. The rod is movable as according to arrow 70. A spiral spring 71 exerts a bias, whereby handle 59 is held to the left according to FIG. 3. This is the starting position. A user will pull handle 59, whereby a movement as according to arrow 70 takes place. The position shown in FIG. 3 is the position wherein the handle is shown in the pulled-out position.

Disc 69 is rotated as according to arrow 73 via hinge 72, wherein cams 74,75 arranged on a rod 76 are displaced in recesses 77,78 in disc 69 as according to arrow 79,80. Rods 76 hereby move outward from the starting position as according to arrows 81,82. Rods 76 are hingedly connected to clamping parts 83,84 which are arranged pivotally on seat 49. These clamping parts can pivot about the respective axes 85,86 as according to arrows 87,88. In the position of use the hooking part 89,90 clamps in a respective recess 91 in central part 2. Only one recess is visible. The recesses are arranged on either side of central part 2.

Protrusion 92 is received in receiving space 93 of the clamp.

When the clamps engage on protrusions 92 and are received in recess 91, seat part 48 is then situated in the position of use, wherein the whole unit from handle 51 to hooking parts 89,90 and recesses 91 together form the locking means for locking seat part 48 in the position of use. The pivoting according to arrow 61 is therefore blocked in the position of use. In the locked position the seat part is situated above central part 2, whereby the central part is not accessible from this top side. The parts visible in FIG. 3 on the top side of central part 2 are covered and not directly accessible to the user. They are made accessible by unlocking by means of handle 59 and by pivoting seat part 48 as according to arrow 61 to the position shown in FIG. 3.

FIG. 3 further shows that seat part 48 can be pivoted to substantially the same plane as the plane of pushers 36,37 and backrest 53. This is a preliminary to reaching the compact position, wherein the parts of the carriage take up a position which is less voluminous.

Not visible in FIG. 3, but also possible, is pivoting of the additional leg support part 51 about hinge 50. This support surface can also be placed in substantially the same surface as backrest 53 and arms 36,37.

Figure 8:
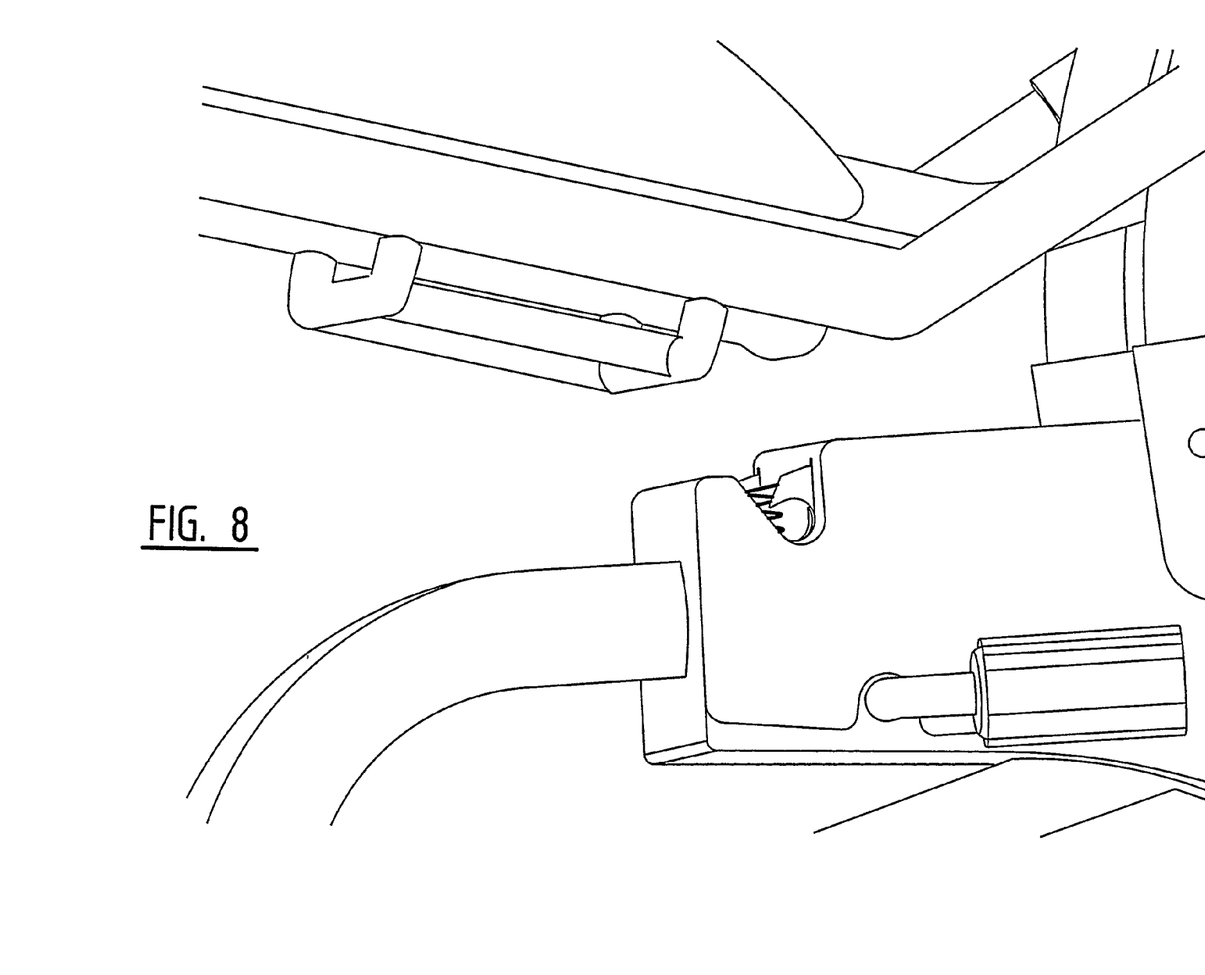
FIG. 8 is a perspective view of another embodiment of the locking.

Several other embodiments for the locking means are possible. In one embodiment the handle 59 is arranged on the central part and clamps are further arranged on the central part which engage on for instance the second arm 47. The second arm 47 can be engaged in hooking manner, whereby it is locked in the position of use. The hooking and engagement can be broken by means of the handle, whereby second arm 47 can be pivoted as according to arrow 67. This embodiment is not shown. Reference is made to FIG. 8. The idea of the invention is not changed by changing the locking mechanism. The placing of the locking means on seat part 48 and/or on central part 2 and/or on another part does not affect the invention.

FIG. 3 further shows a more precise view of pivot shaft 35 of pushers 36,37. It can be seen that pushers 36,37 are pivotally connected with their outer ends to the central part, wherein these ends lie mutually in line. The ends are engaged, for instance by sleeve ends of a sleeve received in a receiving space 101 arranged on central part 2. Clamp 54 of backrest 53 is also connected to sleeve 100. Sleeve 100 will pivot about pivot shaft 35 as according to arrow 102.

Handle 103, which in the shown embodiment is received in a receiving chamber 104 of the upper part 64 of central part 2, is also connected to sleeve 100. The operation of handle 103 will be explained on the basis of FIGS. 4 and 5, wherein parts of central part 2 are concealed, whereby the operation of handle 103 becomes more clearly visible.

Figure 4:
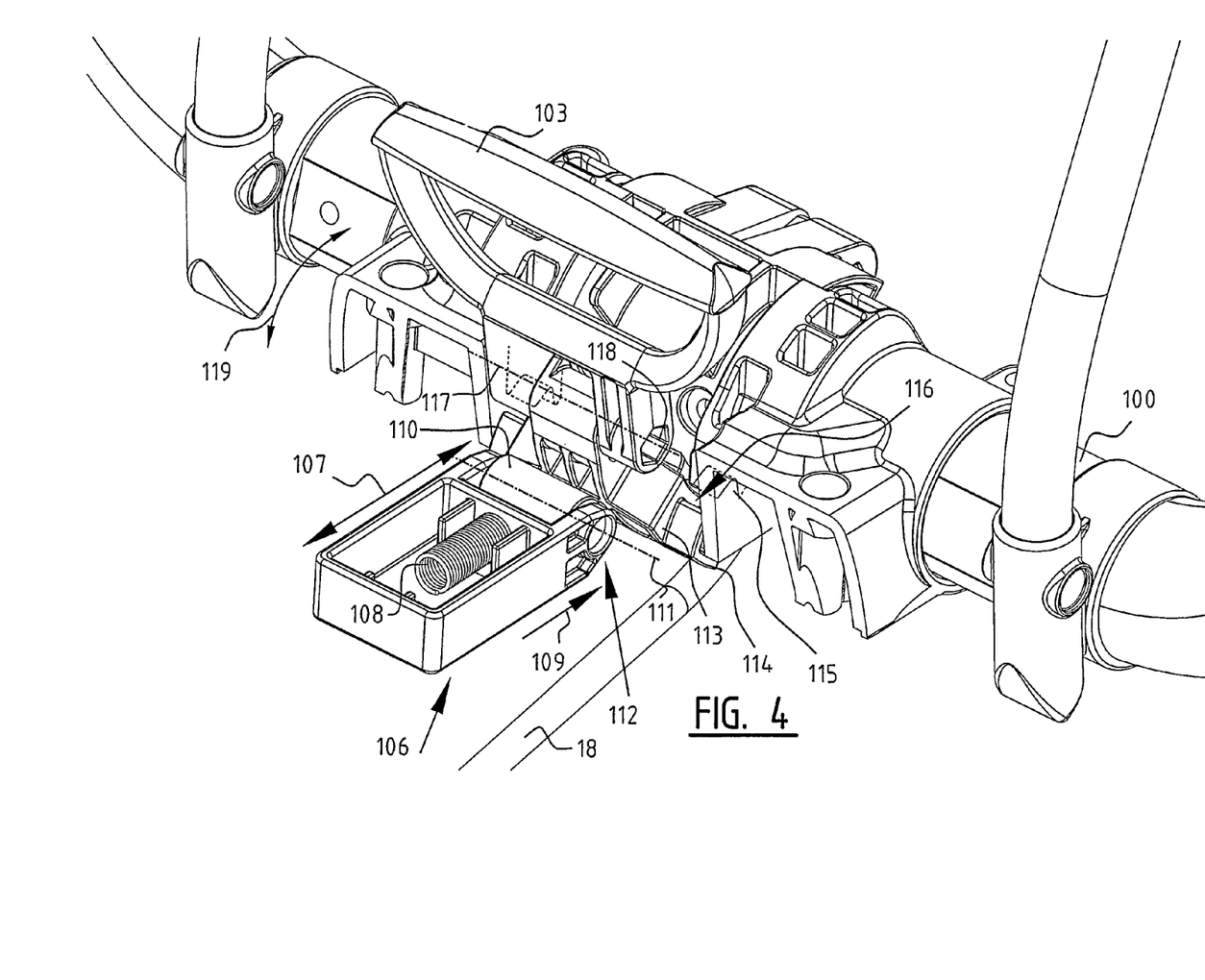
FIG. 4 is a partly cut-away view of a detail of FIG. 3 in a further unlocked position.

Accommodated in central part 2 is a pressing part 106 which is received movably as according to arrow 107 in central part 2. Pressing part 106 stands under a bias from spiral spring 108 which causes a bias in the direction 109. The outer end of pressing part 106 is provided with a cylinder 110 which is connected to the outer end 112 of pressing part 106 for rotation about axis 111. Cylinder 110 exerts a pressure on the intermediate part 113 arranged between handle 103 and the connection of the handle to sleeve 100. Intermediate part 113 is pushed in the direction of arrow 109 by pressing part 112. The protrusion 114 arranged on either side of intermediate part 113 will hereby be received in a recess 115 arranged in the central part.

FIG. 4 shows an unlocked position wherein protrusion 114 is moved out of recess 115 as according to arrow 116, whereby the protrusion is released. When protrusion 114 is received in recess 115, this protrusion, together with the central part, locks the movement of handle 103 and, as will be explained further, rotation of sleeve 100 and therefore movement of said first arms.

Intermediate part 114 is connected hingedly to handle 103, wherein axis 117 of hinge 118 is indicated in FIG. 4. Owing to hinge 118 the handle 103 can move as according to arrow 119, wherein handle 103 can be displaced out of receiving space 104 as shown in FIG. 3. FIG. 3 shows the starting position of handle 103 before it is moved to the position according to FIG. 4. Additionally, it is possible to move intermediate part 114 counter to the pressure of pressing means 106, whereby protrusion 114 is released from the engagement in recess 115. An operator of carriage 1 grasping the handle 103 will exert a force which overcomes the pressure of pressing means 106 in direction 109, whereby the locking is released.

When the buggy according to the invention is carried from the compact position to the position of use, the handle is moved back to the position as shown in FIG. 3 and protrusion 114 is secured in recess 115, thereby achieving locking of the position of use. Seat 48 can then be locked on the top side of central part 2 as according to arrow 61 by means of locking means 59-90. The connection is easy to make since the first arms are already pre-positioned in the position of use.

In the shown embodiment the buggy 1 is provided with two locking means acting independently of each other for the purpose of locking the position of use. First locking means are arranged in the shown embodiment on seat part 48, whereby seat part 48 is locked on central part 2 in the position of use, while second locking means are arranged in central part 2 and embodied substantially by protrusion 114 and recess 115.

Figure 5:
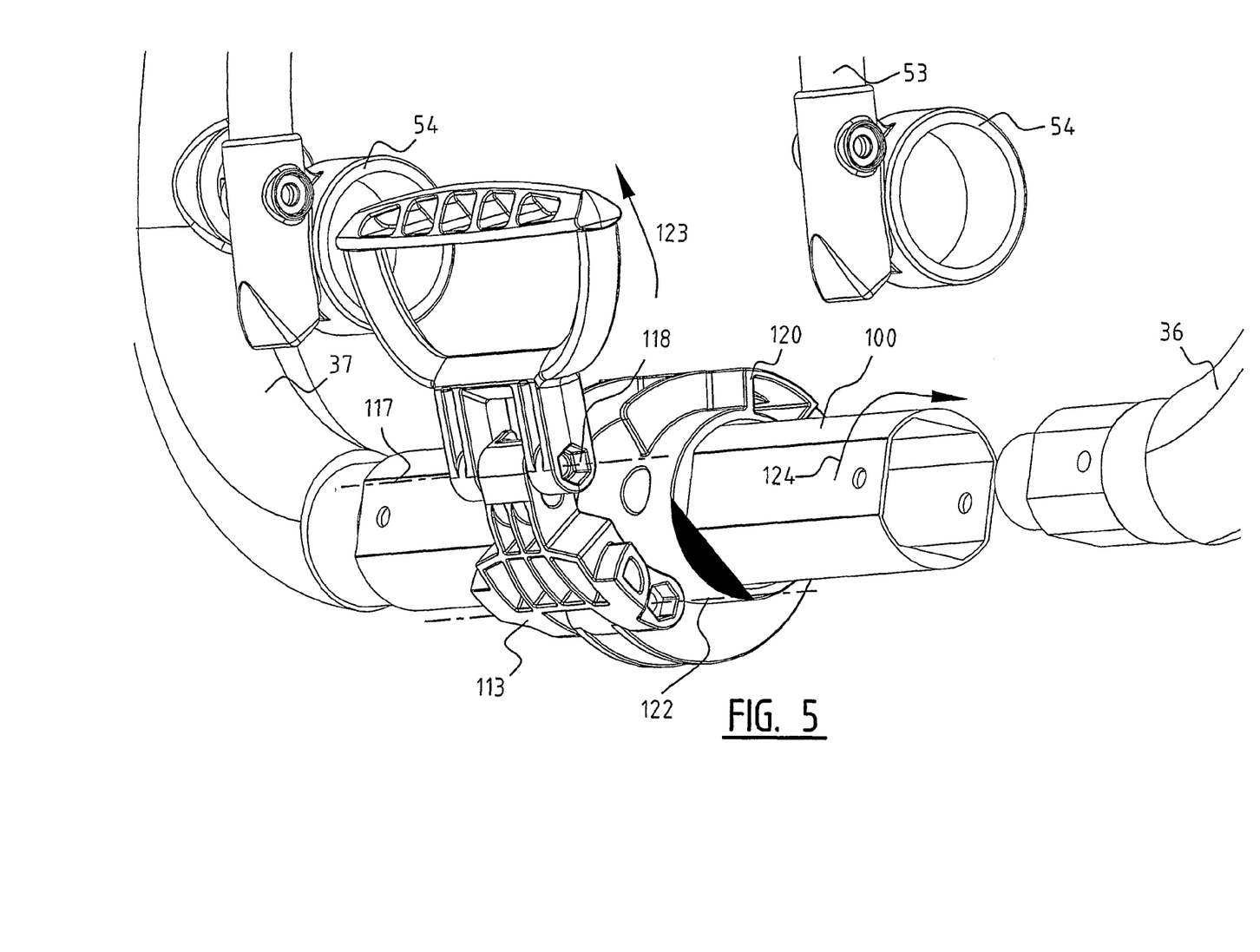
FIG. 5 shows a schematic view of the pivot shaft of the pushers of the carriage of FIG. 1.

FIG. 5 shows a further cut-away view of sleeve 100, first arms 36,37 and clamps 54 of backrest 53. Mounted on sleeve 100 is a body 120 which is formed by injection moulding. Body 120 connects to sleeve 100 in form-fitting manner. A second hinge 121 with axis 122 is arranged on body 120, whereby intermediate part 113 is connected to part 120. Hinge 118 with axis 117 can further be seen. When the locking of protrusions 114 and recess 115 is unlocked, a user can pull handle 103 in the direction of arrow 123, for instance by pushing against central part 2 (not shown in FIG. 5).

Owing to the movement in the direction of arrow 123 the sleeve 100 will rotate as according to arrow 124 in that the movement 123 is transmitted to part 120 via hinges 118,122. Sleeve 100 will hereby rotate, arms 36 will rotate and the backrest arranged on the arms by clamping will also rotate. The pivoting movement 124 is transmitted to sliding part 14 via coupling rod 18 which engages on part 120 via a hinge, and to rear arms 21,31 via coupling rods 17 and 19. Movement of all first arms is thus possible by means of one handle, and buggy 1 can be carried from the position of use shown in FIG. 1 to the compact position according to FIG. 7.

The operation of the handle as described with reference to FIGS. 3,4,5 can be the subject of a divisional application related to this inventive concept. The handle can be applied in carriages and buggies without making use of the second arm 47.

Figure 6:
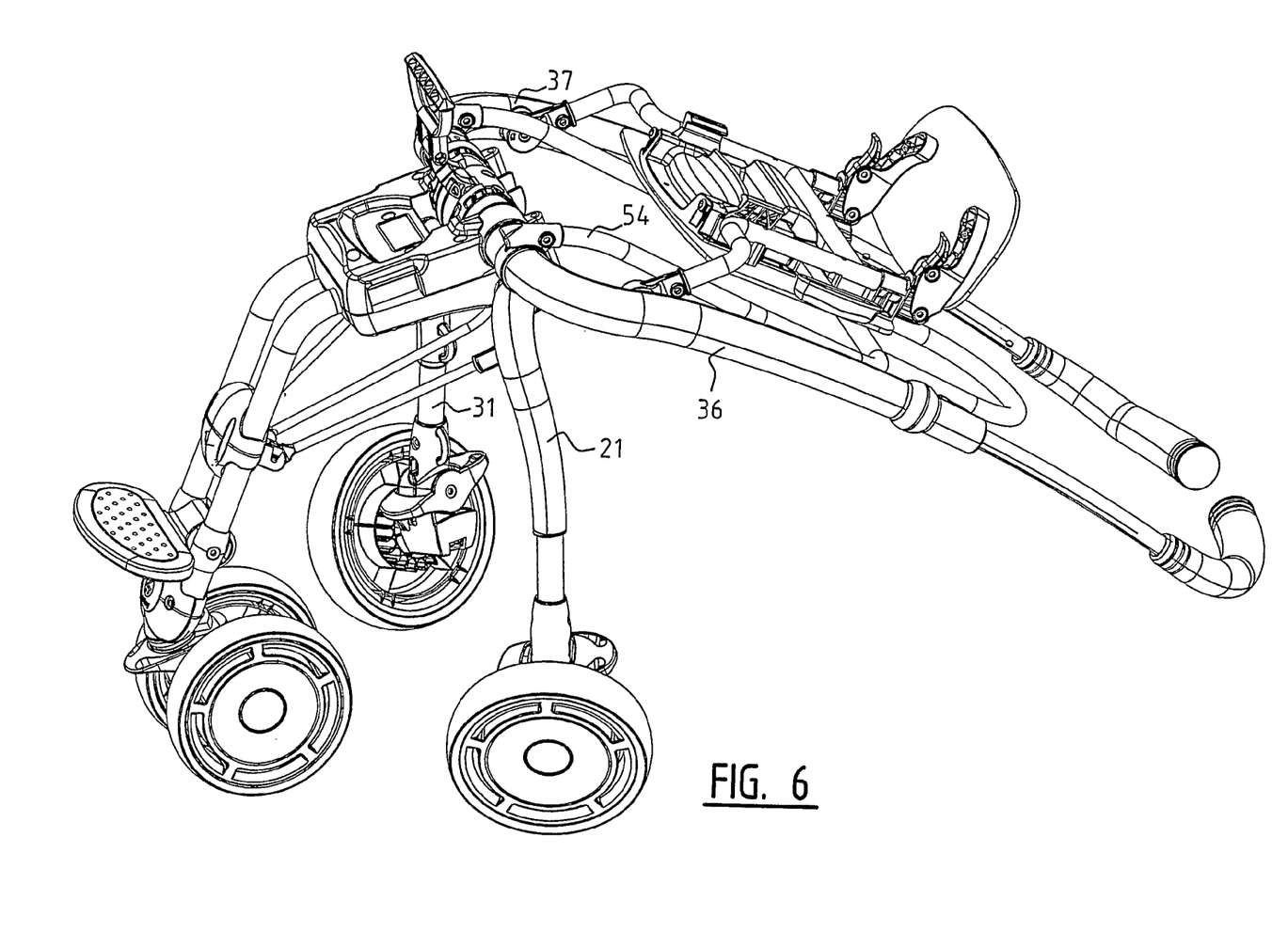
FIG. 6 shows a carriage according to the invention in a situation between the position of use and the compact position.

FIG. 6 shows the buggy in a partly folded position, wherein the user pulls handle 103 and wherein the collection of first arms 36,37, arms 54,21,31 are all moved pivotally to the compact position as shown in FIG. 7 by means of the respective coupling means. The telescopic arms 39,40 can be received in pushers 36,37 as according to arrow 140, whereby a further compact position is obtained. The compact position of the buggy can be transported by the user gripping handle 103. The package shown in FIG. 7 can easily be stowed away or for instance transported in the boot of a car.

The invention is shown on the basis of an exemplary embodiment. Different modifications are possible within the invention. The invention is protected by the appended claims. All the measures stated in the description can however be the subject of a divisional application and can be taken together in a shown combination. Measures for which no particular advantage is stated here can also be the subject of a divisional application.

The invention claimed is:

1. Carriage, for instance for a buggy, comprising:
   a frame which comprises at least one central part to which are pivotally and directly connected a pusher and an arm provided with a bearing-mounted wheel, wherein the pusher and the arm are placeable in a position of use and in a compact position; and
   locking means for locking the pusher and the arm in the position of use, at least one second arm being pivotally connected to at least one of the pusher and the arm, wherein said at least one second arm is lockable in the position of use by locking means at least partially located on the at least one central part, and wherein said locking means releasably engages said at least one second arm, enabling the second arm to move away from the central part when switching from the position of use to the compact position.

2. Carriage as claimed in claim 1, wherein the at least one second arm includes locking means which co-act with locking means on the at least one central part for the purpose of locking the pusher and the arm in the position of use.

3. Carriage as claimed in claim 1, wherein the locking means are adapted to lock in the position of use one of the pusher and the arm and one of the at least one second arm.

4. Carriage as claimed in claim 3, wherein the locking means engage on the pusher for the purpose of locking the pusher in the position of use.

5. Carriage as claimed in claim 1, wherein the at least one second arm is connected to the pusher by means of a hinge.

6. Carriage as claimed in claim 5, wherein the pusher comprises two pusher arms, which are each provided with a hinge by means of which the at least one second arm is connected.

7. Carriage as claimed in claim 1, wherein the pusher comprises two pusher arms which have a common pivot shaft.

8. Carriage as claimed in claim 7, wherein the two pusher arms are mutually connected via the common pivot shaft.

9. Carriage as claimed in claim 1, wherein a support means is coupled to the at least one second arm.

10. Carriage as claimed in claim 9, wherein the support means is a seat.

11. Carriage as claimed in claim 1, wherein each of the pusher and the arm is coupled to the other of said pusher and said arm by means of a coupling device.

12. Carriage as claimed in claim 11, wherein the at least one central part is fixedly connected to at least one third arm which is embodied as a guide, and that the coupling device comprises a number of coupling rods which are connected to the pusher and the arm and which are connected to a guide means which can be guided on the guide.

13. Carriage as claimed in claim 1, wherein the carriage comprises a handle which is connected to a pivot shaft of at least one of the pusher and the arm.

14. Carriage as claimed in claim 13, wherein the handle is received in a receiving space of the at least one central part.

15. Carriage as claimed in claim 14, wherein the at least one second arm locked in the position of use blocks the receiving space at least partially.

16. Carriage as claimed in claim 14, wherein the at least one second arm is provided with a seat, and wherein the seat blocks access to the receiving space in the position of use.

17. Carriage as claimed in claim 13, wherein the handle is connected to a pivot shaft of the pusher or the arm via a hinge and is provided with a projection which, in the position of use, is received in a recess in the at least one central part for the purpose of locking the position of use.

18. Carriage as claimed in claim 1, comprising a further arm provided with a bearing-mounted wheel, as defined in claim 1, wherein the arm and the further arm have two different pivot axes.

* * * * *